(12) United States Patent
Murphy et al.

(10) Patent No.: US 11,270,313 B2
(45) Date of Patent: Mar. 8, 2022

(54) REAL-TIME RESOURCE ACCOUNT VERIFICATION PROCESSING SYSTEM

(71) Applicant: BANK OF AMERICA CORPORATION, Charlotte, NC (US)

(72) Inventors: Paul Benton Murphy, Tigard, OR (US); Joseph Benjamin Castinado, North Glenn, CO (US); Richard C. Clow, II, Morristown, NJ (US); Charles Russell Kendall, Snoqualmie, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 298 days.

(21) Appl. No.: 16/285,497

(22) Filed: Feb. 26, 2019

(65) Prior Publication Data

US 2020/0273043 A1 Aug. 27, 2020

(51) Int. Cl.
*G06Q 20/42* (2012.01)
*G06Q 40/02* (2012.01)
*G06Q 20/02* (2012.01)

(52) U.S. Cl.
CPC .......... *G06Q 20/425* (2013.01); *G06Q 20/02* (2013.01); *G06Q 40/02* (2013.01)

(58) Field of Classification Search
CPC ...... G06Q 20/425; G06Q 40/02; G06Q 20/02; G06Q 20/023; G06Q 20/10; G06Q 20/4016; G06Q 20/4037
See application file for complete search history.

(56) References Cited

U.S. PATENT DOCUMENTS

| | | | | |
|---|---|---|---|---|
| 7,249,096 B1* | 7/2007 | Lasater | ................. | G06Q 20/04 705/35 |
| 8,548,886 B1* | 10/2013 | Bosch | ................... | G06Q 40/00 705/35 |
| 10,185,936 B2* | 1/2019 | O'Leary | ................ | G06Q 20/10 |
| 2003/0126075 A1* | 7/2003 | Mascavage, III | ...... | G06Q 20/02 705/39 |
| 2012/0173422 A1* | 7/2012 | Hu | ......................... | G06Q 40/02 705/44 |

(Continued)

OTHER PUBLICATIONS

Alhothaily, Abdulrahman et al. "QuickCash: Secure Transfer Payment Systems." Sensors (Basel, Switzerland) vol. 17,6 1376. Jun. 13, 2017, doi:10.3390/s17061376 (Year: 2017).*

*Primary Examiner* — Patrick McAtee
*Assistant Examiner* — Nakia Leffall-Allen
(74) *Attorney, Agent, or Firm* — Moore & Van Allen PLLC; Nicholas C. Russell

(57) ABSTRACT

Embodiments of the present invention provide a system for real-time resource account verification processing for authentication of a user. The system provides a communication linkage between entities that are real-time payment network enabled participates to communication and confirm account verification. As such, via RFI messaging an entity may request verification of user resource accounts. The system may identify the entity associated with the resources, deploy a secure communication via the RFI messaging platform, and receive a verification in real-time. The system allows for performance of this communication on a backend secure RFI messaging center without third party knowledge of account verification processing. Thus limiting verification, disruption, and processing lag.

16 Claims, 8 Drawing Sheets

(56) References Cited

U.S. PATENT DOCUMENTS

| | | | |
|---|---|---|---|
| 2012/0310828 A1* | 12/2012 | Hu | G06Q 20/108 |
| | | | 705/44 |
| 2015/0134524 A1* | 5/2015 | Kaufman | G06Q 40/02 |
| | | | 705/44 |
| 2018/0121975 A1* | 5/2018 | Weinflash | G06Q 40/02 |
| 2018/0189781 A1* | 7/2018 | McCann | G06Q 20/202 |
| 2020/0226558 A1* | 7/2020 | Castinado | G06Q 20/023 |
| 2021/0182957 A1* | 6/2021 | Hu | G06Q 20/108 |

* cited by examiner

REAL-TIME RESOURCE ACCOUNT VERIFICATION PROCESSING SYSTEM

BACKGROUND

Event execution, and the subsequent analysis and resolution of executed events typically require timely communication between multiple systems and entities, and remedial measures are typically delayed by subsequent authorization and resolution. By implementing an interactive system for providing verification of third parties, real-time resolutions can be implemented for executed events without unnecessary and timely intermediary steps.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

In resource distribution processing networks, a need exists to have the ability to verify a third party account prior to transmission of a real-time resource distribution. Currently, in order to verify a third party account prior to transmission of a real-time resource distribution, they use of the external account needs to be verified to ensure the customer is the owner or has legal access to the funds in that external account and that the account is in good standing at the external financial institution. Currently, there are two ways to do this verification. First, via a third party service that aggregates information from all financial institutions and generates a centralized place for querying for verification of the account of the third party and that the account can be used for payments or monetary transactions. Second, via a trial deposit method, where random resource amounts may be distributed and deposited in to the third party account and the user must confirm back the values of those deposits.

In some embodiments, the invention allows all real-time payment network participating institutions to directly control the validation of accounts to anyone else on the network.

In some embodiments, the system may leverage the Request for Information (RFI) message within a real-time payment to directly request general information from the external financial institution about a specific RTN/ABA routing number, account number, or the like. The external financial institution will receive the request via the RFI message and will provide back in the response general information about the type of account, status of the account and potential uses of that account. The system allows for performance of this communication on a backend secure RFI messaging center without the customer knowing this account verification is taking place.

In some embodiments, the system may further leverage credit transfer via real-time payment to send a trial deposit and in real time, while the user is in communication with an associate have the user confirm the amounts of the trial deposit.

In this way, the system allows for connectivity across entities to share resource account information about users for real-time payment enabled verification of account ownership and assess to external accounts.

Embodiments of the present invention address the above needs and/or achieve other advantages by providing apparatuses (e.g., a system, computer program product and/or other devices) and methods for providing real-time account verification, the invention comprising: generating a communicable linkage between entities within a real-time payment network, wherein the communicable linkage includes a tagged request for information message associated with the network; identifying a user request requiring verification; receiving information about a funding account for the user, wherein the funding account is associated with a different entity; generating a request for information message within a real-time payment network to the different entity requesting information, wherein the request for information comprises a request for verification of the funding account; and receiving communication from the different entity across the communicable linkage via the request for information message created via the real-time payment network without processing a transaction along the real-time payment network.

In some embodiments, the request for information message associated with the real-time payment network further comprises a secure messaging platform for account verification across entities. In some embodiments, the request for information message is transformed from being used in a transaction to being a communication linkage for account verification.

In some embodiments, identifying the user request requiring verification further comprises receiving a request from the user to open a new product or to process resources at an entity, wherein the user is not a customer of the entity. In some embodiments, identifying the user request requiring verification further comprises verification of a funding account associated with the user.

In some embodiments, receiving the communication from the different entity further comprises receiving confirmation of the funding account, a resource amount in the funding account, and an owner of the funding account. In some embodiments, receiving the communication from the different entity further comprises confirmation of the funding account and real-time approval of the user request requesting verification. In some embodiments, receiving communication from the different entity confirms non-verification of the funding account and real-time denial of the user request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
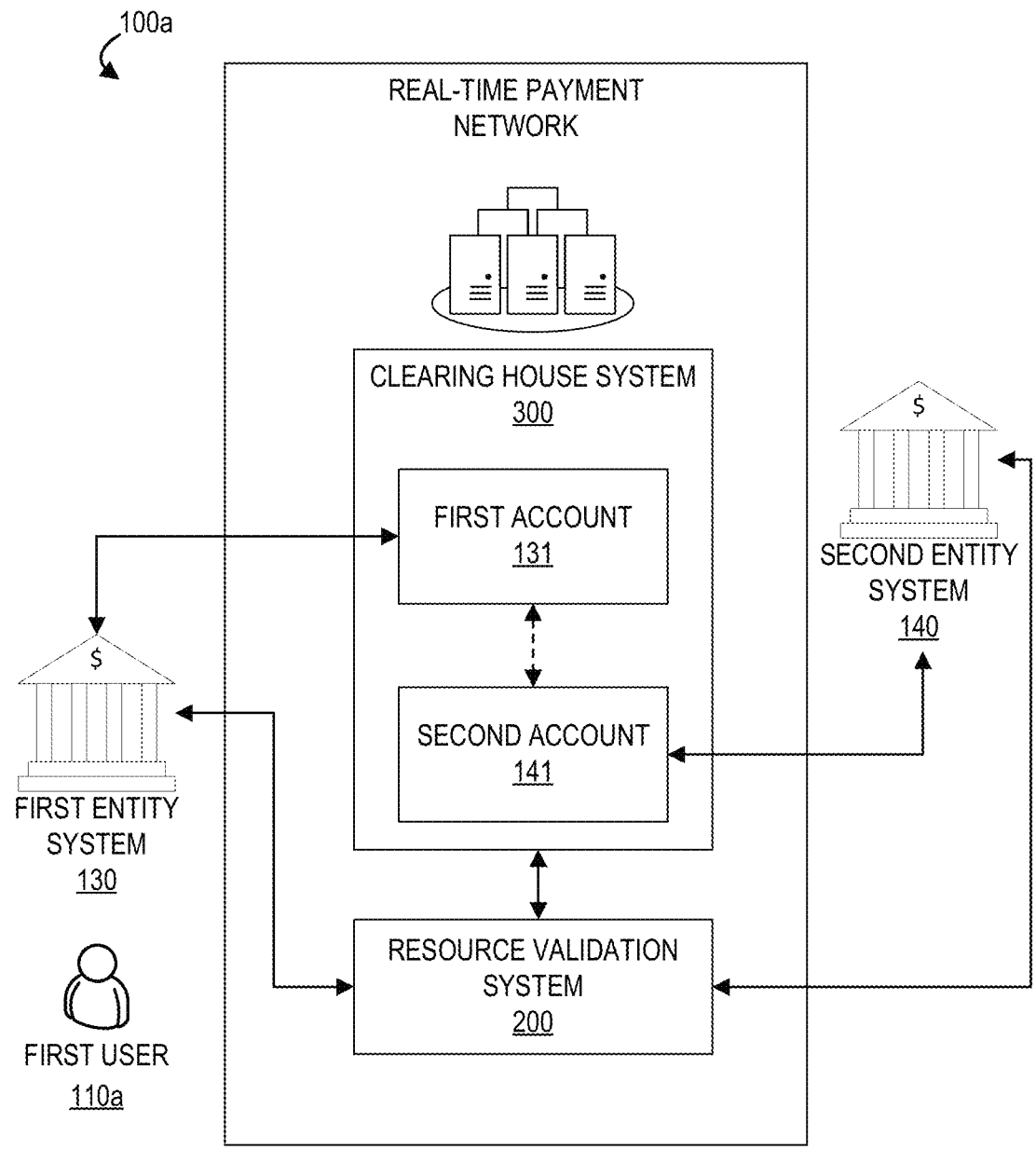

Having thus described embodiments of the invention in general terms, reference will now be made the accompanying drawings, wherein:

FIG. 1A illustrates a diagram illustrating a system environment for real-time resource account verification processing, in accordance with an embodiment of the invention.

Figure 1B:
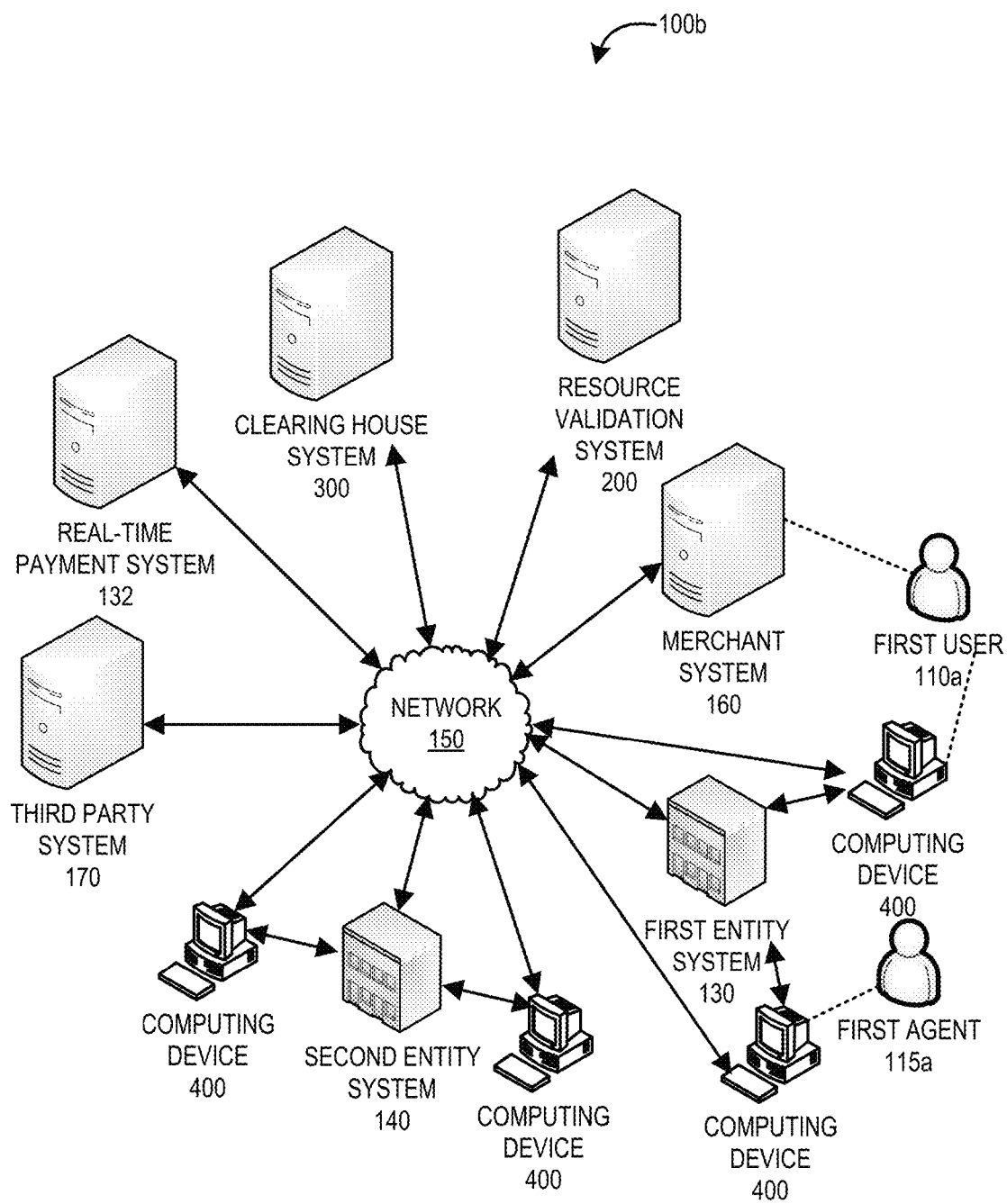

FIG. 1B illustrates a block diagram illustrating a system environment real-time resource account verification processing, in accordance with an embodiment of the invention.

Figure 2:
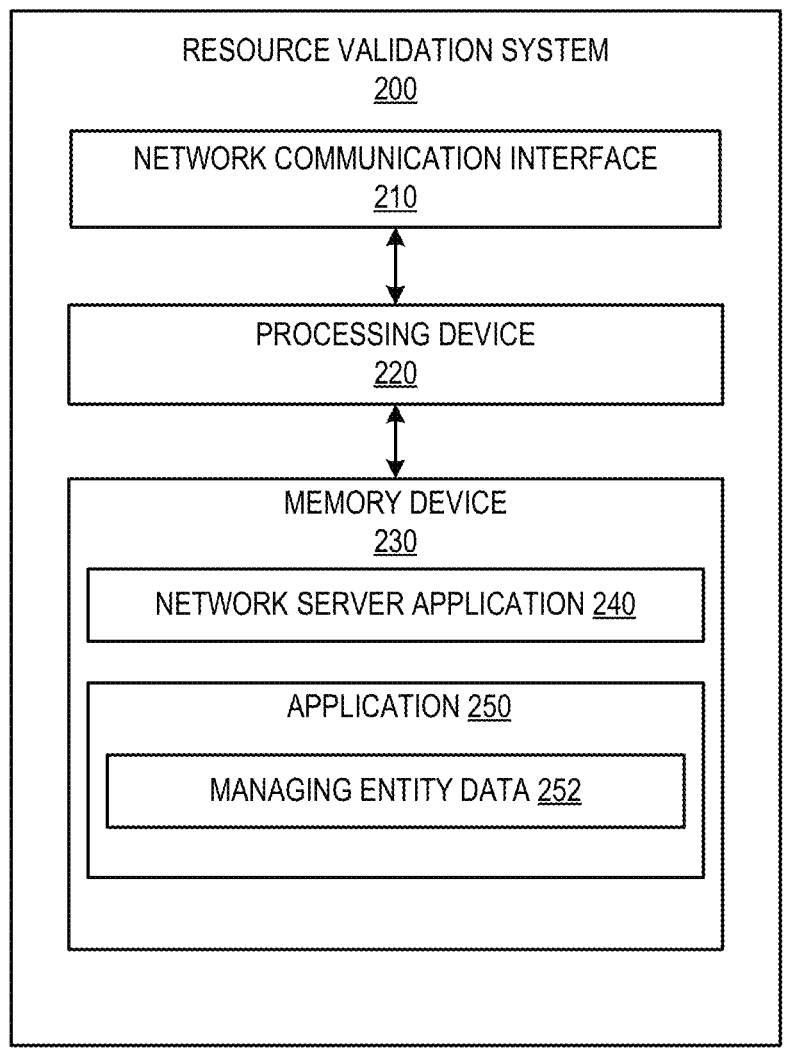
Figure 3:
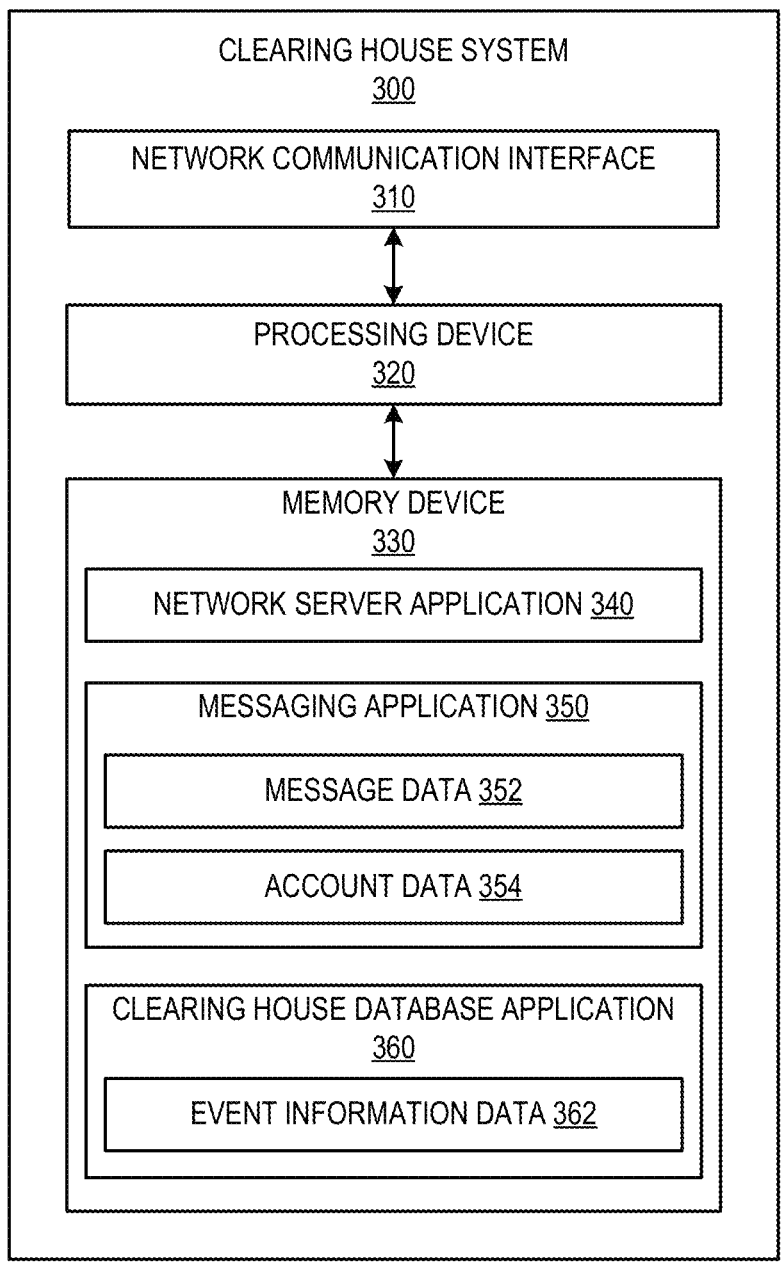
Figure 4:
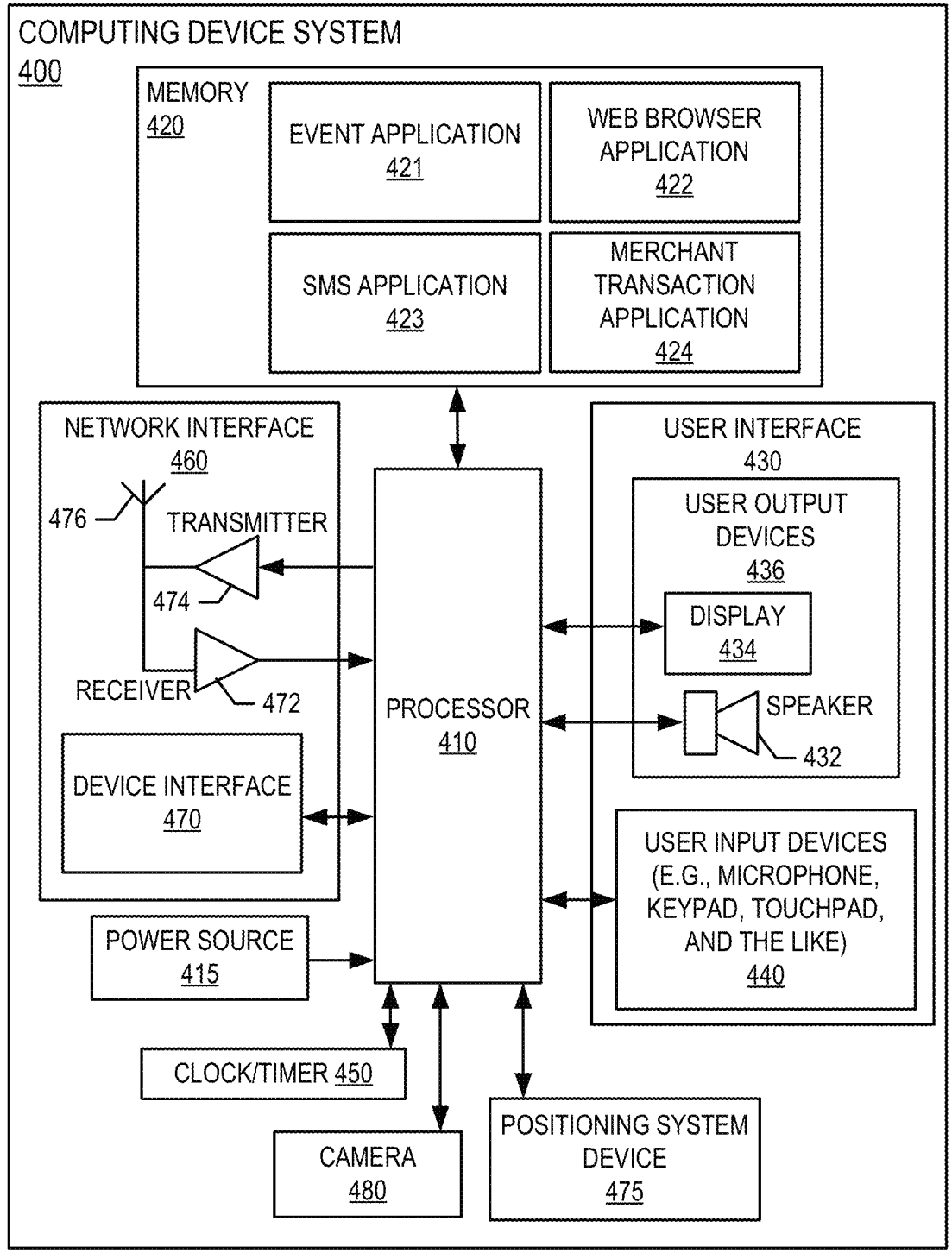
Figure 5:
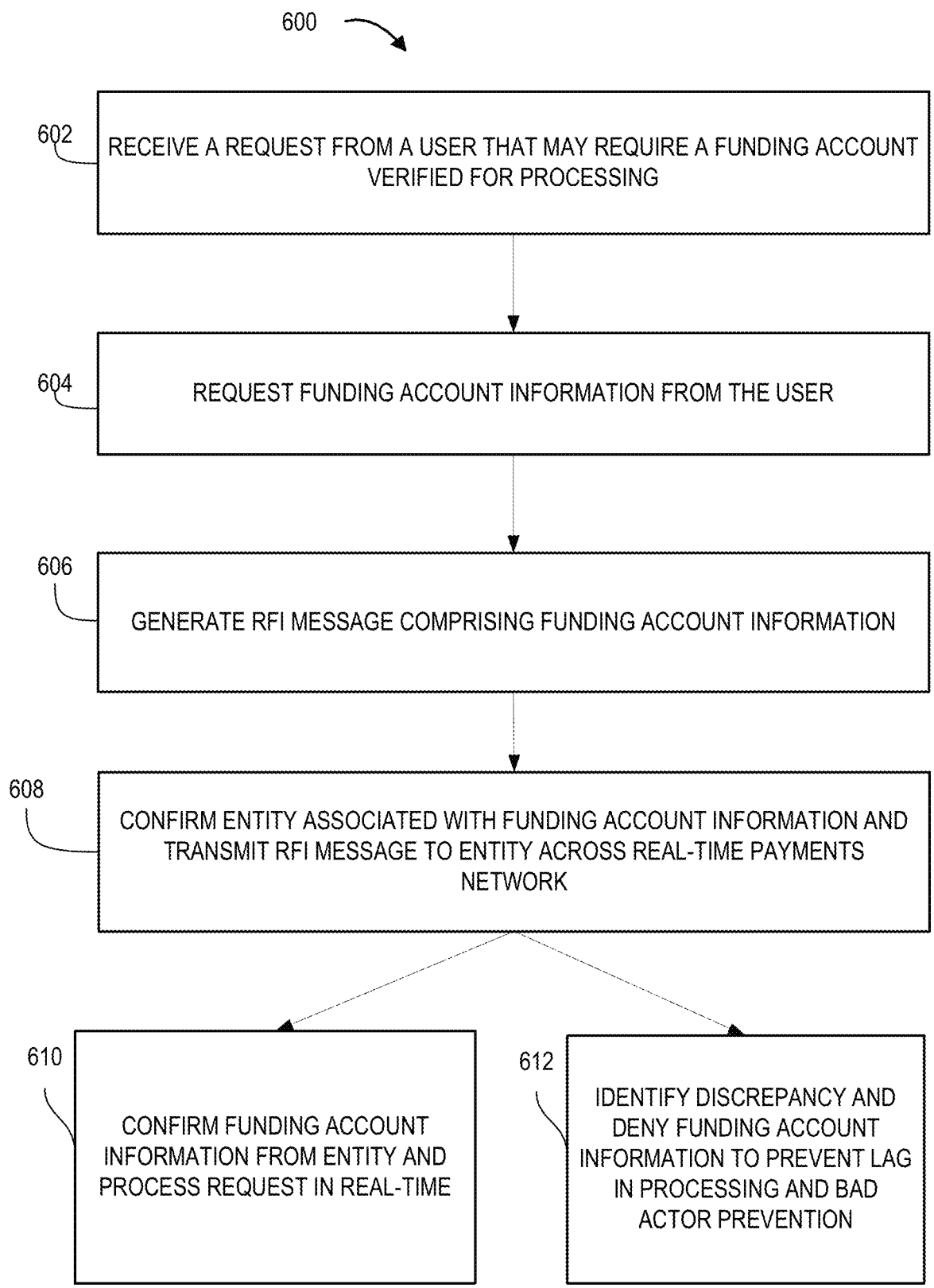
Figure 6:
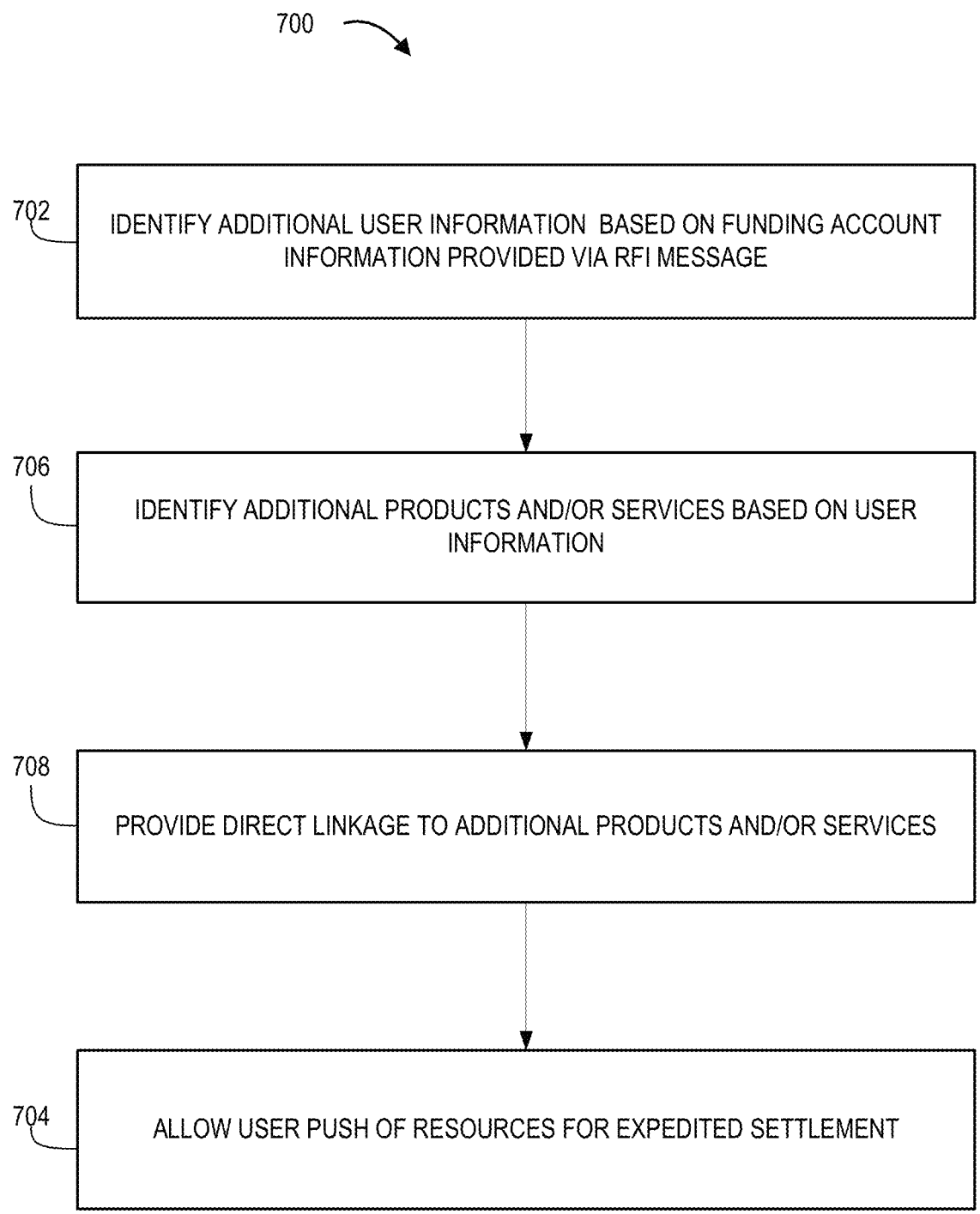
Figure 7:
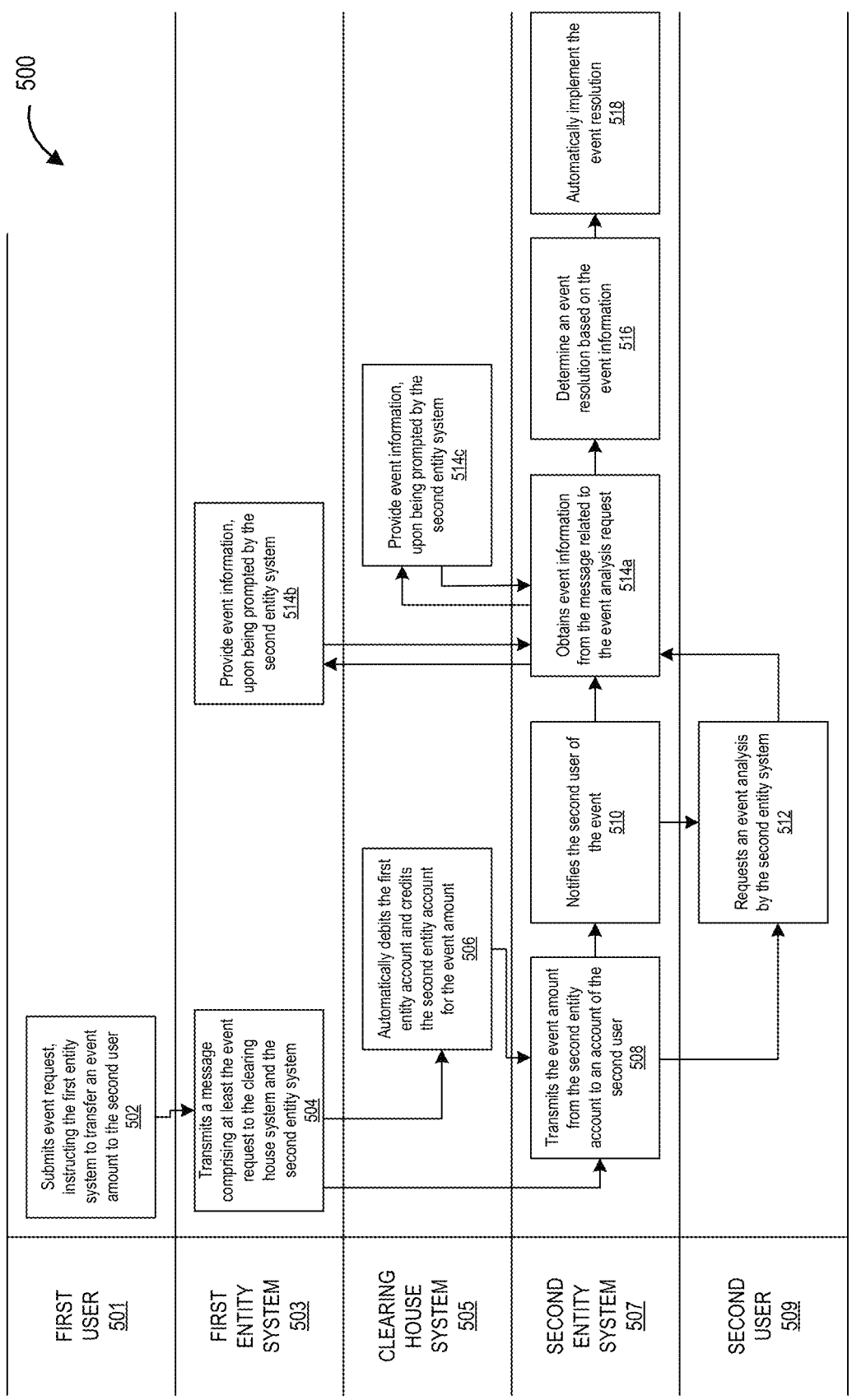

FIG. 2 provides a block diagram illustrating the real-time resource account verification system of FIG. 1B, in accordance with an embodiment of the invention;

FIG. 3 provides a block diagram illustrating the clearing house system of FIG. 1B, in accordance with an embodiment of the invention;

FIG. 4 provides a block diagram illustrating the computing device system of FIG. 1B, in accordance with an embodiment of the invention;

FIG. 5 provides a flowchart illustrating a process for providing real-time account verification processing, in accordance with embodiments of the invention;

FIG. 6 provides a flowchart illustrating a process for real-time account verification product identification processing, in accordance with embodiments of the invention; and FIG. 7 provides a flowchart illustrating a process for real-time resource processing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

A "user" as used herein may refer to any customer of an entity or individual that interacts with an entity. The user may interact with an entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "technology activity" may include a transaction for a product or service from a merchant. A "transaction" or "resource distribution" refers to any communication between a user and an entity to transfer funds for the purchasing or selling of a product or service. A transaction may refer to a purchase of goods or services, a return of goods or services, a payment transaction, a credit transaction, or other interaction involving a user's account. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the transaction may refer to a technology activity such as an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

Currently when users approach a financial institution, where the user could be a business, entity, or the like, and desire to open an account with the financial institution. The user may not have been a customer of the financial institution prior to opening the account. The user may be required to provide a funding account that is external to the financial institution associated with the account the user is opening. The process requires the financial institution to prove user ownership of the funding accounts. Today, there are two ways to do this verification. First, via a third party service that aggregates information from all financial institutions and generates a centralized place for querying for verification of the account of the third party and that the account can be used for payments or monetary transactions. Second, via a trial deposit method, where random resource amounts may be distributed and deposited in to the third party account and the user must confirm back the values of those deposits.

The real-time payment network, upon utilization by multiple financial institutions, will have the data processing power of the third party services that aggregate the information from all financial institutions. Via the RFI text block tied to a transaction on the real-time payment network, financial institutions may be allowed to process and communicate validation of resource accounts securely to each other to confirm and validate the account ownership. As such, the system may confirm, by inputting the user provided funding account information into the RFI message of a real-time payment network. The system may identify the funding account and associated financial institution, transmit the message via the network for confirmation of the ownership, balance, transactions, or the like of the funding account.

In some embodiments, the invention allows all real-time payment network participating institutions to directly control the validation of accounts to anyone else on the network.

In some embodiments, the system may leverage the Request for Information (RFI) message within a real-time payment to directly request general information from the external financial institution about a specific RTN/ABA routing number, account number, or the like. The external financial institution will receive the request via the RFI message and will provide back in the response general information about the type of account, status of the account and potential uses of that account. The system allows for performance of this communication on a backend secure RFI messaging center without the customer knowing this account verification is taking place.

In some embodiments, the system may further leverage credit transfer via real-time payment to send a trial deposit and in real time, while the user is in communication with an associate have the user confirm the amounts of the trial deposit.

In this way, the system allows for connectivity across entities to share resource account information about users for real-time payment enabled verification of account ownership and assess to external accounts.

FIG. 1A illustrates a system environment for real-time resource account verification 100a, in accordance with one embodiment of the invention. In some embodiments, the clearing house 300 is associated with the real-time payment network. In the illustrated environment, a user 110a is associated with (i.e., a customer of) a first entity system 130. A clearing house system 300 comprises a first entity account 131 associated with the first entity system 130 and a second entity account 141 associated with the second entity system 140. A resource verification system 200 that communicably links across the entities and clearing house to provide real-time account verification. The first entity account 131 and the second entity account 141 are accessible by each associated financial institution, the resource verification system 200, and the clearing house system 300 which acts as a trusted intermediary during the verification, transfer, and settlement between the financial institutions. Resources or funds may be transferred by each financial institution to and from their associated account. Transfers between the first entity account 131 and the second entity account 141 are administered by the clearing house system 300 and resource verification system 200 pending authentication and authorization by participating parties of each transfer.

In one embodiment, the first user 110a may request a product or service of a second entity system 140, wherein the first user 110a may be required to provide information about a funding account for product processing. In a specific example, the first user 110a is required to initiate the transfer from the first entity system 130, wherein the first user 110a provides authentication information to authenticate the identity of the first user 110a and to validate that an account of the first user 110a held at the first entity system 130 contains at least an amount of available funds to fulfill funding account requirements.

The first user 110a, as the sending participant (i.e., payor), is required to authenticate the first user's identity by providing information or credentials to the associated financial institution. For example, authentication information may include account numbers, routing numbers, PIN numbers, username and password, date of birth, social security number, or the like, or other authentication information as described herein. In some embodiments, authentication may comprise multi-factor or multi-step authentication in accordance with information security standards and requirements.

Upon initiating an interaction, the first user 110a becomes obligated to a status within a funding account for processing the product at the second entity system 140 associated with a second financial institution. The resource verification system 200 monitors the communications and confirms the communications and fund transfers into the first or second account accurately and provides expedited reconciliation of the transaction. The transfer of funds occurs between the first entity account 131 and second entity account 141 associated with the first entity system 130 and the second entity system 140 on behalf of the user, wherein the interaction may be settled immediately, concurrent with the interaction. As settlement occurs between the representative financial institutions, debiting and crediting of individual user accounts may be managed at each financial institution with their associated customers. As the interaction is settled immediately, funds may be made available for use in real or near real-time.

It should be understood that while the illustrated embodiment of FIG. 1A depicts only a first user, financial institutions, and accounts, other embodiments of a real-time interaction network may comprise a plurality of accounts associated with a plurality financial institutions. In some embodiments, the system environment 100a may further comprise more than one clearing house system 300 (e.g., TCH, the Federal Reserve, and the like) that receive and process interaction requests as described herein. Financial institutions may include one or more community banks, regional banks, credit unions, corporate banks, direct connect financial institutions, and the like.

In accordance with embodiments of the invention, the terms "entity system" may include any organization such as one that processes financial transactions including, but not limited to, financial institutions, banks, credit unions, savings and loan associations, card associations, settlement associations, investment companies, stock brokerages, insurance companies and the like. Furthermore, embodiments of the present invention use the term "user" or "customer." It will be appreciated by someone with ordinary skill in the art that the user or customer may be a customer of the financial institution or a potential customer of the entity (e.g., a financial institution) or an employee of the entity.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1B provides a block diagram illustrating a system environment for real-time resource account verification processing 100b. As illustrated in FIG. 1B, the environment 100 includes a real-time payment system 132, a resource verification system 200, a clearing house system 300, a first entity system 130, a second entity system 140, one or more computing device systems 400, a merchant system 160, and one or more third party systems 170.

Embodiments of the present invention provide a system for a real-time validation of funding accounts. Currently when users approach a financial institution, where the user could be a business, entity, or the like, and desire to open an account or perform an operation requiring a verification of an alternative or funding account. The user may not have been a customer of the financial institution prior to opening the account or performing the operation. The user may be required to provide a funding account that is external to the financial institution associated with the operation the user is performing. The process requires the financial institution to prove user ownership of the funding accounts. Today, there are two ways to do this verification. First, via a third party service that aggregates information from all financial institutions and generates a centralized place for querying for verification of the account of the third party and that the account can be used for payments or monetary transactions. Second, via a trial deposit method, where random resource amounts may be distributed and deposited in to the third party account and the user must confirm back the values of those deposits.

The real-time payment network, upon utilization by multiple financial institutions, will have the data processing power of the third party services that aggregate the information from all financial institutions. Via the RFI text block tied to a transaction on the real-time payment network, financial institutions may be allowed to process and communicate validation of resource accounts securely to each other to confirm and validate the account ownership. As such, the system may confirm, by inputting the user provided funding account information into the RFI message of a real-time payment network. The system may identify the funding account and associated financial institution, transmit the message via the network for confirmation of the ownership, balance, transactions, or the like of the funding account.

One or more users, including a first user 110a, may be in network communication with the first entity system 130, the second entity system 140, or the other systems of the system environment 100b via a computing device system 400. The user may be a customer, client, patron, individual, business, or the like associated with the first entity system 130.

Similarly, one or more agents, including a first agent 115a may be in network communication with the first entity system 130, the second entity system 140, or the other systems of the system environment 100b via a computing device system 400. These agents may be employees, contractors, consultants, claim investigators, claim analysts, transaction analysts, or the like, for the first entity system 130 and/or the second entity system 140.

The real-time payment system 132, resource verification system 200, the clearing house system 300, the first entity system 130, the second entity system 140, the one or more computing device systems 400, the merchant system 160, and the one or more third party systems 170 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The resource verification system 200 may be a system owned or otherwise controlled by a managing entity to perform one or more process steps described herein. In some embodiments, the managing entity is a financial institution, a clearing house entity, a consortium of financial institutions and/or clearing house entities, or the like. While the resource verification system 200 is shown as a separate entity from other systems in the system environment 100b, it should be known that the managing entity may comprise one or more of the other systems in the system environment 100b.

In general, resource verification system 200 is configured to communicate information or instructions with the clearing house system 300, the first entity system 130, the second entity system 140, the one or more computing device systems 400, the merchant system 160, and/or one or more third party systems 170 across the network 150. Of course, the resource verification system 200 may be configured to perform (or instruct other systems to perform) one or more other process steps described herein.

As noted above with respect to FIG. 1A, the clearing house system 300 may be a system owned or controlled by the managing entity and/or a third party that specializes in maintaining financial accounts, performing financial transaction clearing house functions, generating and/or transmitting financial transaction messages, and the like. In general, the clearing house system 300 is configured to communicate information or instructions with the real-time payment system 132, resource verification system 200, the first entity system 130, the second entity system 140, the one or more computing device systems 400, the merchant system 160, and/or the third party system 170 across the network 150. For example, the clearing house system 300 may be configured to receive a message from a computing device system 400 associated with the first user 110a and/or the first entity system 130, transfer an event amount from an account of the first entity system 130 to an account of the second entity system 140, record event information in a clearing house database system, receive a request for the event information along with an event request indicia, and/or extract and transmit the event information stored in the clearing house database system Of course, the clearing house system 300 may be configured to perform (or instruct other systems to perform) one or more other process steps described herein.

The one or more computing device system(s) 400 may be a system owned or controlled by the managing entity, a merchant entity (e.g., a merchant associated with the merchant system 160) and/or a third party that specializes in providing computing devices and/or mobile computing devices to users. In general, a computing device system 400 is configured to provide a communication and/or transaction interface for the first user 110a to provide instructions to, or receive notifications from, the real-time payment system 132, resource verification system 200, the clearing house system 300, the first entity system 130, the second entity system 140, the merchant system 160, and/or the third party system 170 across the network 150. For example, the computing device system 400 associated with the first user 110a may be configured to receive an event request from the first user 110a, generate a message based on the event request (e.g., via an event application stored in the memory of the computing device system 400), and transmit the message and/or event request to the first entity system 130. Of course, the computing device system 400 may be configured to perform (or instruct other systems to perform) one or more other process steps described herein.

The clearing house database system may comprise a network communication interface, a processing device, and one or more memory devices, where the processing devices are configured to perform certain actions with the memory devices and communicate these actions to the rest of the network 150 through its network communication interface. The clearing house database system may be a repository for the clearing house system 300 to store event information. In some embodiments, the clearing house database comprises a blockchain network that records event information, where the event information is accessible to any system or user with the appropriate public blockchain key.

The first entity system 130 may comprise a network communication interface, a processing device, and one or more memory devices, where the processing devices are configured to perform certain actions with the memory devices and communicate these actions to the rest of the network 150 through its network communication interface. In some embodiments, the first entity system 130 comprises a financial institution at which the first user 110a is a customer. The first entity system 130 may have one or more financial accounts that are available to, at least partially controlled by, or otherwise accessible by the clearing house system 300 such that the clearing house system 300 is pre-authorized to execute transactions with the account of the first entity system 130 upon receipt of messages from the first entity system 130, the second entity system 140, and/or the first user 110a.

The second entity system 140 may comprise a network communication interface, a processing device, and one or more memory devices, where the processing devices are configured to perform certain actions with the memory devices and communicate these actions to the rest of the network 150 through its network communication interface. The second entity system 140 may have one or more financial accounts that are available to, at least partially controlled by, or otherwise accessible by the clearing house system 300 such that the clearing house system 300 is pre-authorized to execute transactions with the account of the second entity system 140 upon receipt of messages from the first entity system 130, the second entity system 140, and/or the first user 110a.

The merchant system 160 may be a system owned, operated, managed, or otherwise controlled by a merchant entity (e.g., a business or individual that offers goods or services in return for payment). The merchant system 160 may include or comprise a computing device system 400 as described herein. In some embodiments, the computing device system 400 of the merchant system 160 comprises a point of sale (POS) device or system of devices, barcode scanning devices, universal product code (UPC) scanners, receipt generating and/or printing devices, security video monitoring system devices, card reading devices, near field communication (NFC) chip reading devices, or other transaction, security, or recording devices that the merchant entity can use to process or document a transaction between the merchant entity and a user (e.g., the first user 110a).

The merchant system 160 may be configured to begin processing certain transactions with the first user 110a by receiving payment information of the first user 110a (e.g., scanning a financial instrument like a credit card of the user 110a that is associated with a financial account of the first user 110a, receiving a transmission of financial account information from the computing device system 400 of the user 110a, receiving payment credentials of the first user 110a via an online merchant portal established or managed by the merchant system 160, or the like). The merchant system 160 may then transmit transaction information to the first entity system 130 (and not through a traditional credit or debit card processing network), either by providing the transaction information to the first agent 115a or by entering the transaction information into a predetermined template that the first entity system 130 is configured to automatically convert into a message for the clearing house system 300 and/or the second entity system 140.

In some embodiments, the merchant system 160 is configured to record, assign, store, or otherwise transmit certain transaction information across the network 150 to the clearing house database system or to an event database of the first entity system 130 and/or the second entity system 140. For example, the system may store a record of one or more products purchased, time-stamp information for the transaction, an image or video of an individual associated with the transaction, financial instrument information for the transaction, terms and conditions of sale, an image or digital copy of the merchant receipt, an image or digital copy of the first user's 110a receipt, return policy documentation, loyalty rewards policy information and documentation, and the like. This information may, in some embodiments, be considered at least a part of the additional information of a message, as described herein.

While the merchant system 160 may be configured to initiate a transaction within the system environment 100b, it should be known that the merchant system 160 may additionally be considered the first user 110a. For example, the merchant system 160 may manage a transaction with an individual that triggers a transmission of a loyalty reward of a discount code, a rebate, and/or other additional information. The merchant system 160 may then take the place of the first user 110a in the system environment 100b to initiate a new transaction or event, via the first entity system 130 and the clearing house system 300. In another example, the first user 110a is an individual that enters into a transaction with the merchant system 160 via a computing device system 400 of the merchant system 160, where the payment is processed via the first entity system 130 and the clearing house system 300 to the second entity system 140 that ultimately pays the merchant system 160.

The third party system 170 may be any system that is in communication with the network 150 and executes one or more functions or process steps of the processes described herein with respect to the system environment 100b.

FIG. 2 provides a block diagram illustrating the resource verification system 200, in greater detail, in accordance with embodiments of the invention. As illustrated in FIG. 2, in one embodiment of the invention, the resource verification system 200 includes one or more processing devices 220 operatively coupled to a network communication interface 210 and a memory device 230. In certain embodiments, the resource verification system 200 is operated by a first entity, such as a financial institution, while in other embodiments, the resource verification system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the resource verification system 200 described herein. For example, in one embodiment of the resource verification system 200, the memory device 230 includes, but is not limited to, a network server application 240, a reconciliation application 250 which includes reconciliation data 252 and other computer-executable instructions or other data. The computer-executable program code of the network server application 240 and/or the reconciliation application 250 may instruct the processing device 220 to perform certain logic, data-processing, and data-storing functions of the resource verification system 200 described herein, as well as communication functions of the resource verification system 200.

The application 250 may be configured to invoke or use the data 252 to perform one or more processes and functions of the other systems (i.e., the clearing house system 300, the first entity system 130, the second entity system 140, the merchant system 160, the third party system 170, and/or the one or more computing device systems 400) within the system environment 100b, as defined or described herein.

FIG. 3 provides a block diagram illustrating the clearing house system 300, in greater detail, in accordance with embodiments of the invention. As illustrated in FIG. 3, in one embodiment of the invention, the clearing house system 300 includes one or more processing devices 320 operatively coupled to a network communication interface 310 and a memory device 330. In certain embodiments, the clearing house system 300 is operated by a first entity, such as a financial institution, while in other embodiments, the clearing house system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the clearing house system 300 described herein. For example, in one embodiment of the clearing house system 300, the memory device 330 includes, but is not limited to, a network server application 340, a messaging application 350 which includes message data 352 and account data 354, a clearing house database application 360 which includes event information data 362, and other computer-executable instructions or other data. The computer-executable program code of the network server application 340, the messaging application 350, and/or the clearing house database application 360 may instruct the processing device 320 to perform certain logic, data-processing, and data-storing functions of the clearing house system 300 described herein, as well as communication functions of the clearing house system 300.

In one embodiment, the messaging application 350 includes message data 352 and account data 354. The message data 352 may comprise instructions, terms, amounts, descriptions, content, and other information that is to be transferred from a first entity system to another entity system via a notification and/or as a transaction between accounts of each entity system. The account data may include account numbers, pre-authorization data, account limits or other threshold information, and the like that allows the clearing house system 300 to automatically transfer funds from a first entity system's account to a second entity system's accounts without additional approvals or confirmations from the entities, based on instructions provided to the clearing house system 300 via a received message.

In one embodiment, the clearing house database application 360 includes event information data 362. This event information data 362 may include documents, contracts, agreements, user generated or curated content, media, files, notifications, memorandum, notes, and other information that is associated with one or more events that are processed by the clearing house system 300. The clearing house database application 360 may be configured to access its database and identify event information based on received inputs of reference numbers, passcodes, database index positions, public blockchain keys, and the like.

The network server application 340 the messaging application 350, and the clearing house database application 360 are configured to invoke or use the message data 352, the account data 354, the event information data 362, and the like when communicating through the network communication interface 310 with the real-time payment system 132, the resource verification system 200, the one or more computing device systems 400, the first entity system 130, the second entity system 140, the merchant system 160, and/or the third party system 170.

FIG. 4 provides a block diagram illustrating an example computing device system 400 of FIG. 1B in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA resource verification system 2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or an event application 421 (or any other application provided by the resource verification system 200 and/or the clearing house system 300). These applications also typically instructions to a graphical user interface (GUI) on the display 430 that allows the user 110 to interact with the computing device system 400, the resource verification system 200, and/or other devices or systems. In one embodiment of the invention, when the user (e.g., user 110a) decides to enroll in an event application 421 program, the user downloads, is assigned, or otherwise obtains the event application 421 from the resource verification system 200, the clearing house system 300, the first entity system 130, the second entity system 140, or from a distinct application server. In other embodiments of the invention, the user 110 interacts with the real-time payment system 132, resource verification system 200, the clearing house system 300, the first entity system 130, the second entity system 140, a third party system, or another computing device system 400 via the web browser application 422 in addition to, or instead of, the event application 421.

The event application 421 may be configured to transmit and receive messages, notifications, calls, electronic mail messages, and the like, between a user and an entity associated with the event (e.g., a first entity system, a second entity system, and/or a clearing house system). In this way, the event application 421 acts as a communication interface that allows the user to perform any of the user-controlled or initiated actions described herein.

The memory 420 of the computing device system 400 may comprise a Short Message Service (SMS) application 423 configured to send, receive, and store data, information, communications, alerts, and the like via a wireless telephone network.

In embodiments where the computing device system 400 is owned, managed, or otherwise controlled by the merchant system 160, the memory 420 may include a merchant transaction application 424 that is configured to perform certain tasks associated with identifying products or services being purchased, initiating the processing of financial instruments being used to purchase the products or services, generating receipt information associated with transactions, recording supplemental information associated with products or services being purchased, and the like. For example, the merchant transaction application 424 may be configured to scan barcode information or otherwise identify a UPC for a product being purchased at a merchant location. The merchant transaction application 424 may additionally be configured to cause the camera 480 to acquire an image and/or video media of a region around or associated with a point of sale terminal (e.g., a component of the computing device system 400 of the merchant system 160) to record information about an individual engaging in a transaction with the merchant entity, and this media can be stored or otherwise recorded as additional information for the transaction or event.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process for providing real-time account verification processing 600, in accordance with embodiments of the invention. As illustrated in block 602, the process 600 is initiated by receiving a request from a user that may require a funding account verified for processing. In this way, the user may not be associated with the financial institution. The user may be requesting to open an account or perform another operation at the financial institution that requires a funding account validation. The funding account may have resources at a different financial institution that may be required for validation of the current operation being requested.

Once the system identifies that the user is requesting an operation that requires an account verification for processing. The system may request funding account information from the user, as illustrated in block 604. The user may provide information such as a financial institution, account number, resource amount, or the like associated with the funding account required for verification for the operation being requested.

As illustrated in block 606, once the user has provided information about the funding account, the system may generate an RFI message comprising the funding account information. The RFI message is a built in message system associated with a real-time payment network. While the real-time payment network typically is used for processing transactions, as illustrated below in FIG. 7. The system translates the network and utilizes the network instead as a secure communication network for transmission of communication of the funding account information request transmission. Once the system generates the RFI message comprising the funding account information, the system may transmit the RFI information across the real-time payment network to the financial institution that houses the funding account.

As illustrated in block 608, the process 600 continues by confirming the entity associated with the funding account information and transmit the RFI message to the entity across the real-time payments network. In this way, the system transforms and utilizes a payment network rail for secure communications with another financial entity on the network. As such, the system provides a secure communication across a real-time payment network via utilization of the RFI message associated with the real-time payment network.

Finally, the financial institution associated with the funding account may transmit information about the funding account to the financial institution that transmitted the request. In this way, in real-time the system may be able to verify the funding account for the account of operation the user is requesting that requires a funding account. As illustrated in block 610, the process 600 continues by confirming the funding account information from the entity and processing the request in real-time. In this way, using the real-time payment network, the system can transmit a request and receive a request across financial institutions in order to confirm a funding account and the resources associated therein.

In some embodiments, as illustrate in block 612, the system may determine that the funding account does not match the user requesting the account or operation and prevents the processing in real-time to prevent lag.

FIG. 6 provides a flowchart illustrating a process for providing real-time account verification processing 700, in accordance with embodiments of the invention. As illustrated in block 702, the process 700 is initiated by identifying additional user information based on the funding account information provided via the RFI message. In this way, the request for information for the funding account associated with the user from a second entity or second financial institution may provide additional information the system may identify for the user. This information may include resource amounts, account information, or the like.

As illustrated in block 706, the process continues by identifying additional products and/or services based on the user information. In this way, based on the information provided via the RFI message the system may be able to identify additional products or services that the user may be interested in. Once identified, the system may provide a direct linage to the additional products or services identified for the user, as illustrated in block 708. In this way, the system may provide additional products or services directly to the user via a communication linkage, such as to the mobile device of the user.

Furthermore, as illustrated in block 704, the system may allow the user to push resources for expedited settlement. As such, the system may utilize the real-time payment network to push funds across the network for payment completion instead of the typically pulling required for transaction completion.

Referring now to FIG. 7, a flowchart is provided to illustrate one embodiment of a process for real-time resource processing 500, in accordance with embodiments of the invention. FIG. 7 illustrates processing a payment across the real-time payment network. This system utilizes the network for message generation and verification across the same network without completion of a transaction, but instead utilization of the messaging processing available across the real-time payment network with a secure processing and secure commutations network. FIG. 7 illustrates a resource transfer or fund transfer via a real-time payment network rail. As shown in FIG. 5, the parties, entities, and/or systems involved in this process 500 may comprise a first user 501 (interacting via a computing device), a first entity system 503 of which the first user 501 is a customer, a clearing house system 505 associated with the real-time payment network for processing transactions in real-time, a second entity system 507, and a second user 509 that is a customer of the second entity system 507. Overall, this process 500 describes how an event (e.g., at least a transfer of funds from the first user 501 to the second user 509) is requested, analyzed, and resolved via a real-time payment network with resource reconciliation.

As used herein, an "event" may comprise an interaction, transaction, transmission of data, communication, or the like between a first user and a second user, as facilitated by a first entity system and a second entity system, via a clearing house system. In some embodiments, the event comprises a payment or other financial transaction, where the first user 501 is paying the second user 509 a transaction amount, so a financial institution (i.e., the first entity system 503) associated with the first user 501 transmits the transaction amount and a message to a financial institution (i.e., the second entity system 507) associated with the second user 509, where the transaction amount is then transferred to an account of the second user 509. The second user 509 may then have a question, concern, or the like regarding the transaction (e.g., regarding the amount of the transaction, the timing of the transaction, the reason for the transaction, and the like). The second user 509 can then request its financial institution to analyze the transaction, determine a resolution, and automatically implement the resolution.

In some embodiments, the process 500 may begin at block 502, where the first user 501 submits an event request such as a real-time payment request to transfer resources, instructing the first entity system to transfer an event amount to the second user.

Again, the event may comprise a transaction of an amount of resources from an account of the first user 501 held by the first entity system 503 to an account of the second user 509 held by the second entity system 507. The request may further be performed via a real-time payment network and include information about the event, background details regarding the event, a contract or other agreement associated with the event (e.g., detailing a transaction that should occur between the first user 501 and the second user 509), content created or curated by the first user 501 (e.g., electronic messages, documents that may be useful to the second user 509, or the like), coupons, rebates, or offers for the second user, receipts associated with the event (e.g., an electronic receipt, invoice, or other recordation of the occurrence of a separate part of the transaction), a memorandum drafted by the first user, or the like.

In some embodiments, the information associated with the event (e.g., "event information") may comprise one or more large data files or require a considerable amount of processing power or resources to transfer the entirety of the event information as part of the event request.

In some embodiments, the process 500 includes block 504, where the first entity system 503 transmits a message comprising at least the event request to the second entity system 507 via the real-time payment network. In some embodiments, the message was generated by the first user 501, either organically or by the first user 501 populating and/or adding to a message template created by the first entity system 503. In some embodiments, an agent of the first entity may receive the event request and generate at least a portion of the message based on the event request. In this way, the agent of the first entity system (e.g., a claims investigation specialist, a transaction specialist, or the like) may be specialized in assisting users like the first user 501 in requesting and/or generating event requests.

As noted, the message comprises at least the event request, which could be a request to transfer a certain amount of funds from an account of the first user 501 to an account of the second user 509. However, the message may also comprise some additional event information including, but not limited to, an explanation of the purpose of the event (e.g., payment for goods or services, rent, payment of an insurance claim, annuity payment, refund, or the like), background information for the event (e.g., a contract or agreement for providing the payment in exchange for goods or services, a contract or agreement for an insurance claim that is being paid, or the like), content created or curated by the first user 501 and/or the first entity system 503 (e.g., discount codes, coupons, digitally autographed work product, or digital copies of work product like articles, movies, books, and/or the like).

At this point, or prior to transmitting the message in block 504, the first entity system 503 may debit an identified account of the first user for the event amount and credit an account of the first entity which may be an account that is associated with the clearing house system 505.

Additionally, in some embodiments, the process 500 includes block 506 that comprises automatically debiting the first entity account and credits the second entity account for the event amount. As described above, both the first entity system 503 and the second entity system 507 have one or more accounts (e.g., financial accounts, data repositories, and/or the like) to automatically debit and/or credit upon instructions or requests found in messages. Because the clearing house system 505 is pre-authorized to perform these transactions, the clearing house system 505 can automatically execute transactions between these accounts in real-time or near real-time as messages with transfer requests are received.

In some embodiments, the clearing house system 505 may additionally or alternatively transmit one or more data files, documentation, reference numbers, database index positions, passcodes, website links, or the like (i.e., "content") from one account or messaging platform to another account or messaging portal. For example, in response to instructions found in the message from the first entity system 503, the clearing house system 505 may transfer a copy of an insurance claim document related to the event request and event amount from a database associated with the first entity system 503 to a database associated with the second entity system 507. The content be in transferred within the message in a complete form that is readable by an application of a computing device of the second entity system 507 and/or a computing device of the second user 509. In other embodiments, the message may contain a reference number or passcode associated with the content that the clearing house system 505, the second entity system 507, and/or the second user 509 can provide to the first entity system 503 and/or the clearing house system 505 to prompt the first entity system 503 and/or the clearing house system 505 to transmit the complete version of the content.

As shown at block 508, the second entity system 507 may then transmit the event amount from the second entity account to an account of the second user 509. As the clearing house system 505 only has access to the accounts of the first entity system 503 and the second entity system 507 (e.g., financial institutions), the second entity system 507 would need to make the final transmittal of the event amount from its account associated with the clearing house system 505 to the account of the second user 509 specified by the first user 501 in the event request (as instructed by the message). Because the second entity system 507 will have received the event amount in real-time (or near real-time) from the clearing house system 505 in response to the message transmittal, the second entity system 507 can automatically transmit this event amount in real-time or near real-time to the account of the second user 509.

The second entity system 507 can then notify the second user 509 of the event, including a notification that the event amount has been credited to the account of the second user 509, as shown at block 510. This notification may comprise details of the event, as input by the first user 501, may comprise a copy of the message, may comprise one or more items from transmitted content, or the like. The second user 509 can review this notification, including the event amount transferred to the account of the second user 509, and determine if the event is what the second user 509 expected.

If the second user 509 has questions about the event, believes there was a mistake in the processing of the event request by the first user 501, the first entity system 503, the clearing house system 505, and/or the second entity system 507, or if the first user 501 would like more information or content associated with the event, then the first user 501 may request an event analysis from the second entity system 507, as shown at block 512. While block 512 illustrates that the second user 509 requests an event analysis from the second entity system 507, it should be known that this event analysis request may be made to the clearing house system 505 and/or the first entity system 503. As such, the steps illustrated by blocks 514a, 516, and/or 518 may be executed by the clearing house system 505 and/or the first entity system 503 instead of, or in addition to, the second entity system 507.

The event analysis request may be made by the second user 509 by contacting the second entity system 507 via an online portal of the second entity system 507, a computing device application of the second entity system 507, by calling an agent of the second entity system 507, by messaging an agent of the second entity system 507, or the like. The event analysis request may comprise a request for investigation of a claim, a request for investigation of a transaction, an audit request, a request for additional information regarding a transaction, a request for certain content associated with the event, and the like. In some embodiments, an agent associated with the second entity system 507 may generate or otherwise initiate the event request on behalf of the second user 509, or conduct the event analysis for testing, customer support, or other purposes that are beneficial to the second entity system 507 and/or the second user 509.

As an example of block 512, the account of the second user 509 may have received a certain amount of funds (i.e., the event amount) from an insurance entity (i.e., the first user 501) that is a fraction of what the second user 509 expected to receive as part of a previously submitted insurance claim. The second user 509 has received the notification from the second entity system 507 that listed the certain amount of funds that the second user 509 has received, and a brief note that the certain amount of funds was provided by the insurance entity pursuant to the previously submitted insurance claim. As the second user 509 expected a different amount of funds to be transferred, the second user 509 submitted an event analysis request to see whether there was an error in the transaction processing stages, or whether there is more information about the claim that would explain why the certain amount of funds was provided instead of the expected amount of funds.

As shown at block 514a, the second entity system 507, in response to receiving the event analysis request, obtains event information from the message that is related to the event analysis request. As noted above, the event information may comprise documentation regarding the event, contracts associated with the event, files or media associated with the event, or the like. In embodiments where the entirety of the event information is provided in the message (e.g., included within the body of the message or as an attachment to the message), then the second entity system 507 can extract the event information from the message and identify the event information that is related to the event analysis request.

However, as noted above, the first user 501, the first entity system 503, and/or the clearing house system 505 may have stored at least a portion of the event information in a database and instead included a reference number, a passcode, a database index position, or the like (individually or collectively "event information indicia") in the message.

In embodiments where the first user 501 and/or the first entity system 503 stored at least a portion of the event information in a first entity system 503 database, the second entity system 507 can request the event information from the first entity system 503, along with the event information indicia identified by the second entity system 507 in the message. The first entity system 503 will then automatically identify, extract (e.g., copy, move, or the like), and provide (e.g., transfer) the event information from its database upon being prompted by the second entity system 507, as shown at block 514b. For example, the second entity system 507 may transmit a request for the event information with a reference number for the event, the first entity system 503 automatically compares the reference number to an internal database to identify which information stored in its database is associated with the reference number, copy the associated event information, and transmit the event information to the second entity system 507 via a secured communication channel. It should be known that one or more of the processes described with respect to block 514b may be executed manually by an agent of the first entity system 503.

In embodiments where the clearing house system 505 has stored the event information in a database that the second entity system 507 does not have direct access to, then the second entity system 507 will transmit an event information request to clearing house system 505, along with the event information indicia identified by the second entity system 507 in the message. The clearing house system 505 will then automatically identify, extract (e.g., copy, move, or the like), and provide (e.g., transfer) the event information from its database upon being prompted by the second entity system 507, as shown at block 514c.

In other embodiments, where the second entity system 507 has access to a clearing house database 511 where the event information is stored (e.g., as indicated by the message), then the second entity system 507 may interact directly with the clearing house database 511 to identify and extract the event information. For example, if the second entity system 507 identifies a database index position of the event information for the clearing house database 511 within the event message, then the second entity system 507 may navigate to the identified database index position within the clearing house database 511 to identify the event information. In some embodiments, the event information may be further protected or encrypted within the clearing house database 511, such that the second entity system 507 is required to provide a passcode, a decryption key, or the like (e.g., as found in, or determined from, the event message) to gain full access to the event information within the event database.

Once the second entity system 507 has access to (or copies of) the event information associated with the event analysis request, the second entity system 507 may determine an event resolution based on the event information, as shown at block 516. The event resolution may comprise a determination that a processing error occurred, and additional funds should be transferred from the account of the first entity system 503 to the account of the second entity system 507, and subsequently on to the account of the second user 509. In other embodiments, the event resolution may comprise a determination that a processing error occurred to transmit too many funds in the original event, and therefore a particular amount of funds should be withdrawn from the account of the second user 509, placed in the account of the second entity system 507, and, in some embodiments, returned to the account of the first entity system 503.

Once the event resolution has been determined, the second entity system 507 may proceed to block 518 to automatically implement the event resolution without requiring additional permission, comments, approvals, or other authorizations. Because the clearing house system 505 pre-authorization from both the first entity system 503 and the second entity system 507, resolution transactions can occur in real time (or near real time) once an entity determines that a processing error was made. In this way, the second user 509 can be made whole in real time, instead of having to contact the second entity system 507, the first entity system 503, and/or the first user 501 individually to determine whether an issue in the transaction has occurred and how to resolve the issue.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing real-time account verification, the system comprising:
   a memory device; and
   a processing device operatively coupled to the memory device, wherein the processing device is configured to execute computer-readable program code to:
      identify a user request for an operation, wherein the user request for the operation requires a funding account and validation of the funding account for processing, wherein the funding account has resources at a different entity not associated with the operation, wherein the different entity is a real-time payment network participating institution;
      generate a request for information message to the different entity, wherein the request for information message comprises a request for verification of the funding account and wherein the request for information message comprises a text block within a transaction record on a real-time payment network;
      transmit the request for information message via a transaction record across the real-time payment network to the different entity, wherein the request for information message associated with the transaction record sent to the different entity on the real-time payment network and comprises the request for verification of funding account; and
      receive communication from the different entity via the real-time payment network without processing a transaction along the real-time payment network identifying the funding account and confirming ownership and a balance of the funding account.

2. The system of claim 1, wherein the request for information message associated with the real-time payment network further comprises a secure messaging platform for account verification across entities.

3. The system of claim 1, wherein the request for information message is transformed from being used in a transaction to being a communication linkage for account verification.

4. The system of claim 1, wherein identifying the user request requiring verification further comprises receiving a request from the user to open a new product or to process resources at an entity, wherein the user is not a customer of the entity.

5. The system of claim 1, wherein identifying the user request requiring verification further comprises verification of a funding account associated with the user.

6. The system of claim 1, wherein receiving the communication from the different entity further comprises receiving confirmation of the funding account, a resource amount in the funding account, and an owner of the funding account.

7. The system of claim 1, wherein receiving the communication from the different entity further comprises confirmation of the funding account and real-time approval of the user.

8. The system of claim 1, wherein receiving communication from the different entity confirms real-time denial of the user request.

9. A computer program product for providing real-time account verification, the computer program product comprising at least one non-transitory computer-readable medium having computer-readable program code portions embodied therein, the computer-readable program code portions comprising:
   identifying a user request for an operation, wherein the user request for the operation requires a funding account and validation of the funding account for processing, wherein the funding account has resources at a different entity not associated with the operation, wherein the different entity is a real-time payment network participating institution;
   generating a request for information message to the different entity, wherein the request for information message comprises a request for verification of the funding account and wherein the request for information message comprises a text block within a transaction record on a real-time payment network;
   transmitting the request for information message via a transaction record across the real-time payment network to the different entity, wherein the request for information message associated with the transaction record sent to the different entity on the real-time payment network and comprises the request for verification of funding account; and
   receiving communication from the different entity via the real-time payment network without processing a transaction along the real-time payment network identifying the funding account and confirming ownership and a balance of the funding account.

10. The computer program product of claim 9, wherein the request for information message associated with the real-time payment network further comprises a secure messaging platform for account verification across entities.

11. The computer program product of claim 9, wherein the request for information message is transformed from being used in a transaction to being a communication linkage for account verification.

12. The computer program product of claim 9, wherein identifying the user request requiring verification further comprises receiving a request from the user to open a new product or to process resources at an entity, wherein the user is not a customer of the entity.

13. The computer program product of claim 9, wherein identifying the user request requiring verification further comprises verification of a funding account associated with the user.

14. The computer program product of claim 9, wherein receiving the communication from the different entity further comprises receiving confirmation of the funding account, a resource amount in the funding account, and an owner of the funding account.

15. The computer program product of claim 9, wherein receiving the communication from the different entity further comprises confirmation of the funding account and real-time approval of the user.

16. The computer program product of claim 9, wherein receiving communication from the different entity confirms and real-time denial of the user request.

* * * * *